Patented Sept. 9, 1941

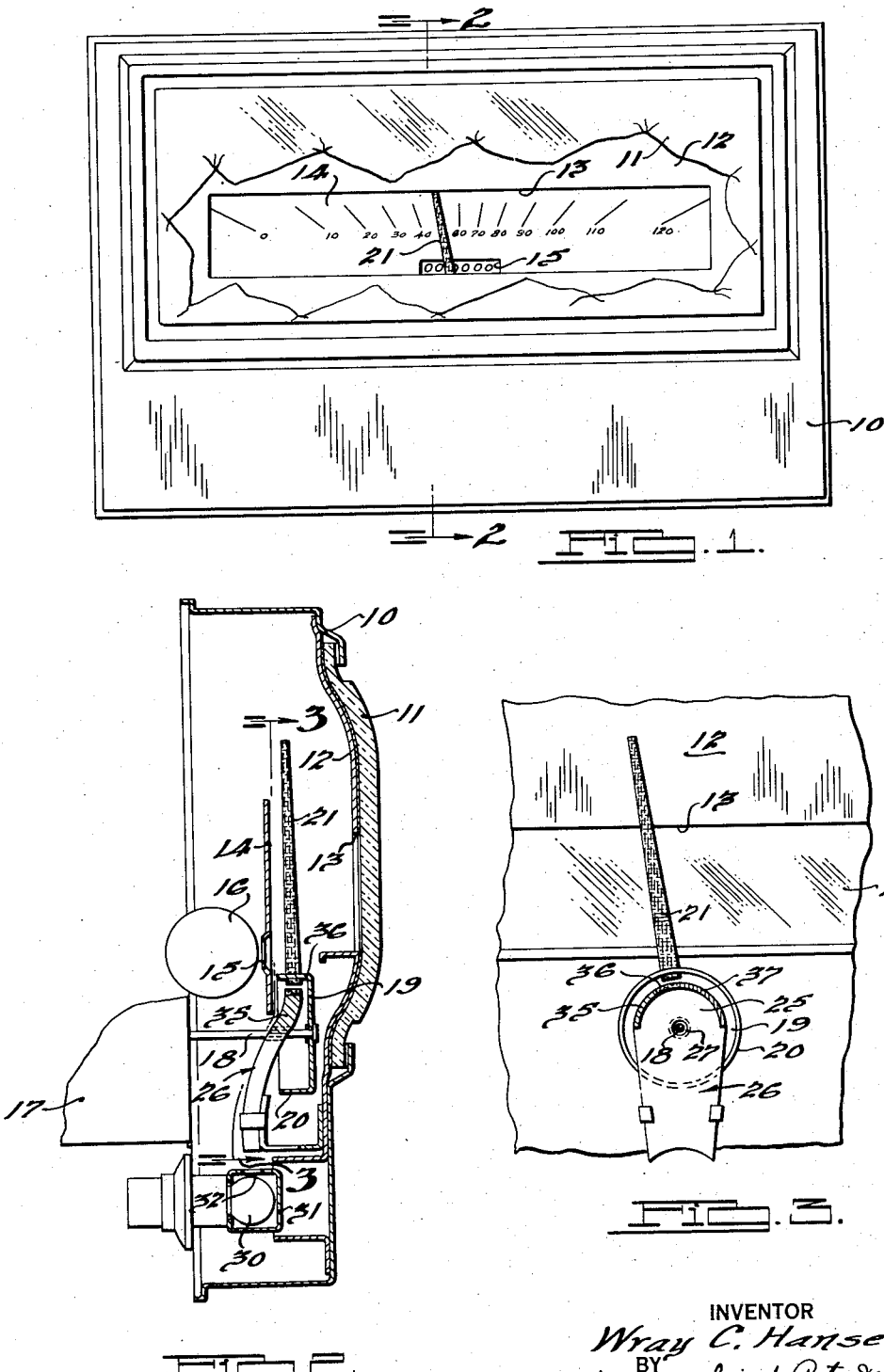

2,255,663

UNITED STATES PATENT OFFICE 2,255,663

INDICATING INSTRUMENT

Wray C. Hansen, Highland Park, Mich., assignor to Chrysler Corporation, Highland Park, Mich., a corporation of Delaware Application July 29, 1940, Serial No. 348,103

4 Claims. (Cl. 116—129)

My present invention relates to visual indicators such as speedometers for use on automobile dashboards. Visual indicators are often designed for use in dark or semi-dark localities or for use during both day and night, so that an indicator which would normally be visible becomes practically inoperative at some times, as when night has fallen. For this reason various types of visual indicators have been provided with means for illuminating either a portion of the indicator or the dial with which the indicator cooperates so as to make the same visible in the dark.

A speedometer or other indicator for use in an automobile should not only be visible but also should be readily visible while not producing a glare or strong light which would blind or tire the eyes of the driver. For this purpose various means of producing a softly lighted, visible indicator have been devised. It is particularly important in night driving, not only to be able to tell at a glance the approximate position of the indicator needle of a speedometer so as to gauge the approximate speed, but also to have some means of causing the driver to be conscious of his speed without taking his eyes from the road. For this purpose various means have been devised for causing a portion of an indicator or a dial with which an indicator cooperates to change color at various speeds, such as by having different colored lights flash on the dial as the speed increases or decreases.

It is the principal purpose of this invention to provide a speedometer with a visual indicator which will readily indicate to the driver the approximate rate of speed, or the zone of relative speed at which the vehicle travels, without necessarily taking his eyes from the road. Specifically, the invention comprises means for causing a large, readily visible pointer to change its color at different zones of speed as it moves across a dial face.

A second object of the invention is to provide an indicating instrument, the pointer of which is clearly visible throughout a long range of arcuate movement so that the relative position of the pointer may inform the operator of his approximate rate of travel within each zone of speed.

Another object of the present invention is to arrange a lighted visual indicator instrument so as to have the source of light entirely shielded and to have light transmitted to the region of the visual indicator by the use of members made of a light-transmitting, clear plastic which convey the light from a region of obscurity to the region where it accomplishes the function of the invention without permitting any strong rays of light to blind the observer.

These and other objects of the invention should be readily apparent from a study of the following specification and the accompanying drawing wherein like numerals refer to like parts throughout.

In the drawing.

Fig. 1 is an elevational view of a speedometer for use on an automobile dashboard having the present invention incorporated therein;

Fig. 2 is a vertical section taken substantially along line 2—2 of Fig. 1; and,

Fig. 3 is a vertical section taken substantially along line 3—3 of Fig. 2 and looking in the direction of the arrows.

In the drawing, the numeral 10 refers to a panel such as the dashboard of an automobile having mounted thereon a glass cover 11 for protecting an instrument such as a speedometer. The cover is provided with an inner mask 12 which has an opening 13 therethrough of rectangular configuration and of substantial length with respect to its height so as to provide a relatively long opening extending across a portion of a dashboard. Mounted behind the opening 13 is a dial 14 having indicia thereon corresponding to various speeds of movement, said indicia extending across the space behind the opening 13 so as to be visible to the operator of the vehicle. The dial 14 may, if desired, have a narrow opening 15 therethrough behind which would be located an odometer 16, the total mileage numerals of which would be visible through the opening 15.

Associated with the instrument panel 10 is a conventional speedometer motor 17 of any suitable make and having any suitable provision for translating the speed of the vehicle into miles per hour. It is to be appreciated, however, that the invention is of utility in connection with other mechanisms and may be used to indicate any quantity or quality as is well known in many trades. The motor 17 rotates a shaft 18 extending toward the panel 10 beneath the dial 14, to the outer end of which is fixed a hub 19 having a continuous flange 20 extending back over a portion of the shaft 18 and terminating closely adjacent the front surface of the dial 14. An opening (not shown) is drilled through an upper section of the flange 20 and a pointer 21 is fixed therein by any convenient means. The pointer 21 extends between the cover 11 and the dial 14 in a direction radially outward from the shaft 18 and comprises light transmitting material such as clear plastic, glass or the like. Rotation of the shaft 18 causes the pointer to swing arcuately about an axis of revolution coincident with the axis of the shaft 18, and the longitudinal axis of the pointer 21 is preferably substantially normal to the axis of the shaft 18.

The pointer 21 preferably extends through the flange 20 a short distance so that the inner end of the pointer transcribes an arc of movement about the shaft 18. Mounted within this arc of movement is the upper end 25 of a light-emitting member 26 which preferably comprises a bar of light-transmitting, clear plastic having an opening 27 therethrough through which passes the shaft 18. The upper end of member 26 preferably lies in a plane coincident with the plane of movement of the pointer 21 while the principal portion thereof is bent outwardly so as to clear the lower portion of the flange 20. The lower end of the member 26 is shaped to lie in an arcuate plane about a source of light, such as an electric light globe 30, mounted in a shielding housing 31 having a small slot or opening 32 therein beneath the center of the arcuate end of the bar 26. Light emitted through the slot 32 travels a substantially equal distance vertically throughout the bar 26 since the lower end of the bar is arcuately shaped to conform with the arcuate upper surface of the end 25 fitting within flange 20. Therefore, an equal amount of light will be emitted from each portion of the arcuate upper surface toward the flange 20.

It is to be appreciated that the arrangement so far described would cause the pointer 21 to become visible in the dark since the light emitted from the upper surface of member 25 would cause it to become luminescent. In order to cause the pointer to indicate various zones of speed, the upper surface of the end 25 is provided with light-filtering means of different character in different zones, preferably comprising means to filter all but green wave lengths in the first portion of the range of movement of pointer 21, all but orange or amber wave lengths in a succeeding portion, and all but red wave lengths in the last portion of the range of movement. Preferably the green light is emitted through the first 60° of the arcuate surface, amber light emitted through the next 30°, and red light emitted through the next 90°. Such an arrangement would cause the pointer to glow with a green coloration while transversing the portion of the dial graded from zero to forty miles per hour, to glow with an amber coloration while transversing the portion of the dial marked from forty to sixty miles per hour, and to glow with a red coloration during any higher range of speed. It is, of course, to be appreciated that the filtering medium may be differently arranged so as to indicate other zones of speed or other quantities or qualities. Preferably, the filtering means comprises an applied layer of plastic having color imparted thereto. In the above specific example, the portion 35 would be colored green, the portion 36 would be colored amber, and the portion 37 would be colored red. The portions 35, 36, and 37 may be formed separately and applied to the member 26 or color may be printed or imbedded in the surface of the member by any well known means.

A clear plastic useful in the present invention is known as Lucite, and is a polymerized methyl methacrylate which may be molded into shapes or machined from cast sheets and bars. It is a light, strong substance having a specific gravity of 1.18 to 1.20, tensile strength of 9,000 to 12,000 pounds per square inch and transverse strength of 12,000 to 14,000 pounds per square inch. It has a high light transmission rate in the visible spectrum, transmitting 88% of the light of 4,300 to 7,500 Angstrom units through a two-inch thickness. It may be produced in brilliant transparent and translucent tints by the use of pigments and dyestuffs, and may be cemented by the use of solvents of the lower ketone and ester series, and mixtures of aromatic hydrocarbons with small amounts of alcohols. Other substances having light-transmitting properties may be used without departing from the invention, especially if such other substances have the strength and lightness as well as the light-transmitting qualities of polymethyl methacrylate. One advantage flowing from the use of polymethyl methacrylate is that a large, clearly visible pointer made of this compound may be used without requiring the use of a large speedometer motor or other device used to move indicating pointers.

It is apparent from the drawing that the pointer 21 is preferably substantially twice as long as the width of the opening 13 so as to have a substantial portion of the outer end thereof remain visible when the pointer is at the extreme ranges of movement. Thus the pointer will not only glow with a coloration indicating the various zones or speed but also a substantial portion thereof will always be in the field of vision at such an angularity as readily to indicate the approximate speed of the vehicle. The principal object of the invention, however, is to cause an illuminated pointer to glow with various colorations in successive portions of the arc transcribed thereby as it swings through its complete range of movement.

Having described a preferred embodiment of my present invention, it should be apparent to those skilled in the art that the same permits of modifications in detail and arrangement. All such modifications as come within the scope of the following claims are considered to be a part of my invention.

I claim:

1. A visual indicator comprising a fixed, indicia-bearing surface, a pointer arranged to swing past the indicia on said surface, means to swing said pointer comprising a hub radially supporting said pointer, said hub being formed of opaque material and having a flange on which said pointer is mounted, said flange having a restricted opening therethrough through which light may be projected longitudinally of said pointer, a light-emitting element shielded from said hub and said pointer, and means to illuminate said pointer comprising a bar of light-transmitting material having one end adjacent said light-emitting element to collect light therefrom, an intermediate light-carrying portion extending around the edge of said flange, and a terminal portion lying within said flange and terminating in an extensive, arcuate face adjacent the inner surface of said flange and substantially parallel thereto, said restricted opening being adjacent said arcuate face whereby as the hub rotates light emitted from said arcuate face may be projected through said restricted opening longitudinally of said pointer.

2. A visual indicator comprising a fixed, indicia-bearing surface, a pointer arranged to swing past the indicia on said surface, means to swing said pointer comprising a hub radially supporting said pointer, said hub being formed of opaque material and having a flange on which said pointer is mounted, said flange having a restricted opening therethrough through which light may be projected longitudinally of said pointer, a light-emitting element shielded from said hub and said pointer, means to illuminate said pointer comprising a bar of light-transmitting material having one end adjacent said light-emitting element to collect light therefrom, an intermediate light-carrying portion for conducting light to within close proximity of said flange, and a terminal portion lying adjacent said flange and terminating in an extensive, arcuate face adjacent the inner surface of said flange and substantially parallel thereto, said restricted opening being adjacent said arcuate face whereby as the hub rotates light emitted from said arcuate face may be projected through said restricted opening longitudinally of said pointer, and light-filtering media imposed on said arcuate face in diverse portions thereof whereby to cause said pointer to assume diverse colorations when in diverse positions.

3. A visual indicator comprising a fixed, indicia-bearing surface, a clear, plastic pointer arranged to swing past the indicia on said surface, means to swing said pointer comprising a hub radially supporting said pointer, said hub being formed of opaque material and having a flange on which said pointer is mounted, said flange having a restricted opening therethrough in which the base of said pointer is mounted and through which light may be projected longitudinally of said pointer, a light-emitting element shielded from said hub and said pointer, and means to illuminate said pointer comprising a bar of clear, plastic material having one end adjacent said light-emitting element to collect light therefrom, an intermediate light-carrying portion extending around the edge of said flange, and a terminal portion lying within said flange and terminating in an extensive, arcuate face adjacent the inner surface of said flange and substantially parallel thereto, said restricted opening and the base of said pointer being adjacent said arcuate face whereby as the hub rotates light emitted from said arcuate face may be projected through said restricted opening and longitudinally through said pointer.

4. A visual indicator comprising a fixed, indicia-bearing surface, a clear, plastic pointer arranged to swing past the indicia on said surface, means to swing said pointer comprising a hub radially supporting said pointer, said hub being formed of opaque material and having a flange on which said pointer is mounted, said flange having a restricted opening therethrough in which the base of said pointer is mounted and through which light may be projected longitudinally of said pointer, a light-emitting element shielded from said hub and said pointer, means to illuminate said pointer comprising a bar of clear, plastic material having one end adjacent said light-emitting element to collect light therefrom, an intermediate light-carrying portion extending around the edge of said flange, and a terminal portion lying within said flange and terminating in an extensive, arcuate face adjacent the inner surface of said flange and substantially parallel thereto, said restricted opening and the base of said pointer being adjacent said arcuate face whereby as the hub rotates light emitted from said arcuate face may be projected through said restricted opening and longitudinally through said pointer, and light-filtering media imposed on said arcuate face in diverse portions thereof whereby to cause said pointer to assume diverse colorations when in diverse positions.

WRAY C. HANSEN.